United States Patent
Bhatnagar et al.

(10) Patent No.: US 10,394,983 B2
(45) Date of Patent: Aug. 27, 2019

(54) METHOD TO AUTOMATICALLY GENERATE AND PROMOTE TIMING CONSTRAINTS IN A SYNOPSYS DESIGN CONSTRAINT FORMAT

(71) Applicant: Excellicon Corporation, Laguna Hills, CA (US)

(72) Inventors: Himanshu Bhatnagar, Laguna Hills, CA (US); Peter Petrov, Laguna Hills, CA (US)

(73) Assignee: Excellicon Corporation, Laguna Hills, CA (US)

( * ) Notice: Subject to any disclaimer, the term of this patent is extended or adjusted under 35 U.S.C. 154(b) by 70 days.

(21) Appl. No.: 15/623,264

(22) Filed: Jun. 14, 2017

(65) Prior Publication Data
US 2018/0365359 A1 Dec. 20, 2018

(51) Int. Cl.
*G06F 17/50* (2006.01)
*G06F 1/04* (2006.01)

(52) U.S. Cl.
CPC ........ *G06F 17/5031* (2013.01); *G06F 17/505* (2013.01); *G06F 17/5081* (2013.01); *G06F 1/04* (2013.01); *G06F 17/5068* (2013.01); *G06F 2217/06* (2013.01); *G06F 2217/84* (2013.01)

(58) Field of Classification Search
None
See application file for complete search history.

(56) References Cited

U.S. PATENT DOCUMENTS

| | | | |
|---|---|---|---|
| 6,658,628 B1 * | 12/2003 | Landy | G06F 17/5045 716/103 |
| 6,877,139 B2 * | 4/2005 | Daga | G06F 17/5045 716/108 |
| 7,249,334 B2 * | 7/2007 | Nakashiba | G06F 17/5031 703/16 |

(Continued)

FOREIGN PATENT DOCUMENTS

JP WO 2008/120346 A1 * 10/2008 ............. G06F 17/50

OTHER PUBLICATIONS

S. Golson, "Consistent Timing Constraints with PrinneTinne," SNUG San Jose Jun. 2009, pp. 1-31. (Year: 2009).*

(Continued)

*Primary Examiner* — Leigh M Garbowski
(74) *Attorney, Agent, or Firm* — Henry J. Cittone; Cittone Demers & Arneri, LLP (57) ABSTRACT

A computer-implemented method of promoting timing constraints in an electronic design automation process of a chip is provided. A method of promoting a lower level block's timing constraint to an upper level block by providing an option to preserve the timing intent of the lower level block at the same time, or to modify the timing constraint such that the block level timing is in context to the top level block timing is provided. The method implements automatic promotion of timing constraint in different modes as an integration mode; an isolation mode and combination thereof, wherein the integration mode is independent of SDCs; and the isolation mode is based on the input SDCs. A method of automatically promoting constant values that are defined through a set_case_analysis command in the SDC file is further provided.

18 Claims, 6 Drawing Sheets

(56) References Cited

U.S. PATENT DOCUMENTS

| | | | | |
|---|---|---|---|---|
| 7,299,433 B2 * | 11/2007 | Clement | ............ | G06F 17/5031 716/108 |
| 7,380,229 B2 * | 5/2008 | Byrn | ................. | G06F 17/5045 703/16 |
| 7,406,669 B2 * | 7/2008 | Lindberg | ................. | G06F 1/12 716/108 |
| 7,526,745 B2 * | 4/2009 | Vergara-Escobar | ........................ | G06F 17/5031 703/16 |
| 7,669,155 B2 * | 2/2010 | Ganesan | ............ | G06F 17/5031 716/100 |
| 7,774,730 B2 | 8/2010 | Kanamaru | | |
| 7,962,886 B1 | 6/2011 | Pandey et al. | | |
| 8,042,085 B2 * | 10/2011 | Rahim | ................. | G06F 17/505 703/16 |
| 8,239,805 B2 * | 8/2012 | Rao | .................... | G06F 17/5045 716/110 |
| 8,438,517 B2 * | 5/2013 | Appleton | ............ | G06F 17/5031 716/108 |
| 8,468,479 B2 * | 6/2013 | Tehrani | ............... | G06F 17/5036 716/108 |
| 8,607,186 B2 * | 12/2013 | Sripada | ............... | G06F 17/5022 703/13 |
| 8,627,249 B1 * | 1/2014 | Pandey | ............... | G06F 17/5045 716/108 |
| 8,631,364 B1 * | 1/2014 | Dobkin | ............... | G06F 17/5045 716/100 |
| 8,701,074 B2 * | 4/2014 | Sripada | ............... | G06F 17/5031 716/106 |
| 8,701,075 B2 * | 4/2014 | Dartu | ................. | G06F 17/5031 716/108 |
| 8,977,994 B1 * | 3/2015 | Levitsky | ............. | G06F 17/5031 716/104 |
| 8,977,995 B1 * | 3/2015 | Arora | ................... | G06F 17/505 716/105 |
| 9,201,992 B2 * | 12/2015 | Gangadharan | ...... | G06F 17/5031 |
| 9,953,120 B2 * | 4/2018 | Stevens | ................. | G06F 17/505 |
| 2003/0229871 A1 * | 12/2003 | Nakae | ................. | G06F 17/5031 716/108 |
| 2006/0123370 A1 * | 6/2006 | Vergara-Escobar | ........................ | G06F 17/5031 716/102 |
| 2009/0271750 A1 * | 10/2009 | Richardson | ......... | G06F 17/5031 716/113 |
| 2016/0259879 A1 | 9/2016 | Ganai et al. | | |
| 2018/0232468 A1 * | 8/2018 | Krishna Moorthy Sadhu | ............. | G06F 17/505 |

OTHER PUBLICATIONS

E. Sperling, "Experts At the Table: Timing Constraints," Semiconductor Engineering, Oct. 15, 2010, 4 pages. (Year: 2010).*

* cited by examiner

PRIOR ART

METHOD TO AUTOMATICALLY GENERATE AND PROMOTE TIMING CONSTRAINTS IN A SYNOPSYS DESIGN CONSTRAINT FORMAT

FIELD OF THE INVENTION

The present invention relates to an electronic design automation process, and more particularly, to a method of automatically promoting timing constraints in a Synopsys Design Constraint format from a lower level block to an upper level block of a logic design while maintaining an original timing intent of the lower level block.

BACKGROUND

A system on a chip (SoC) is a circuit that integrates a plurality of components and/or electronic systems on a single substrate. SoCs comprise two main classes when it comes to designing of the SoCs—functionality, and timing; where functionality covers functions and verification of the SoC while timing covers the timing conditions necessary for proper operation of the SoCs.

With the advent of technology, SoC verification problems have largely been solved; however, the timing closure problems have remained the same. One reason is because the development of a timing specification (generally called timing constraints) is still a manual process which invariably results in incomplete or incorrect timing constraints. Also, with increased clocking complexity, shrinking geometries and multiple operational modes of the SoCs, the timing constraints development is tedious and error prone. Most of the SoC designs are delayed and/or failed due to timing constraints problems, yet there is no efficient automated timing constraints solution available in the market.

To solve the timing issues, design teams spend many tedious hours/months in managing the timing constraints (also called Synopsys Design Constraints, or SDC) for each hierarchical block, the full SoC, for each operational mode and finally for different phases of the design cycle. It is difficult to measure the exact amount of time that is spent on constraints development and subsequent refinement as the process is fragmented and depends on size and complexity of the design. Oftentimes, the timing constraints are developed bottom up starting with each block while a top level hardware description language is still being developed. Creating the top level timing constraints based on the lower level block's timing constraints is a manual process and very tedious and time consuming.

What is needed in the art is a method of timing constraints development which is not tedious, time consuming and error prone.

SUMMARY

The present invention addresses many of the deficiencies of the current solutions and provides a unique method of promoting timing constraints from a lower level block to an upper level block of a logic design. The present invention provides an accurate and an error free method of promoting the lower level block(s) timing constraints written in SDC format to the upper level block(s), or to the top level while maintaining an original timing intent of the lower level block(s).

In order to solve the aforementioned problems of timing constraints, the timing constraints from all lower level blocks may be stitched and promoted to the top level block while ensuring that the top level timing constraints reflect the lower level block timing constraints accurately. Thus, the present invention generally provides a method of automatically promoting timing constraints, through a software tool, in the SDC format from a lower level hierarchical logic block(s) to the upper level block(s) of a logic design while maintaining an original timing intent of the lower level block and thus, provides accurate and error free promotion of timing constraints.

In a first aspect of the present invention, a computer-implemented method for promotion of a timing constraint from a lower level block to a top level block of an integrated circuit is provided. The method comprises steps of: extracting, one or more primary clocks defined for corresponding one or more blocks of the integrated circuit; and replacing, said one or more primary clocks of the corresponding block with a one or more generated clocks and stitching said one or more generated clocks to a top level's extracted clocks. The one or more primary clocks are represented in a create_clock command and the one or more generated clocks are represented in a create_generated_clock command. The create_clock is replaced with a create_generated_clock in the promoted SDC file. For each generated clock a master relationship is identified and created while other timing constraints that referred to the primary clocks, such as timing exceptions, clock relationships specified in set_clock_groups, input and/or output delays and the like are created referring to the one or more generated clock. The clocks are promoted to the top level along with properties like frequency, duty cycle, and the other timing constraints. The rest of the block levels constraints that do not depend on the clock names are also promoted with the top level hierarchy reflected in the promoted SDC. This method is used when the lower level blocks timing is to be treated independently from the top level's timing i.e., the block level timing is isolated from the top level. This method may be termed as "Promotion with Isolation". In other words, the block whose timing is to be preserved is called the "Isolated Block"

In a second aspect of the present invention, a computer-implemented method for promotion of a timing constraint from a lower level block to a top level block of an integrated circuit is provided. The method comprises steps of: extracting, one or more clocks from a clock pin of one or more sequential endpoints; and generating automatically a primary clock and a generated clock, prior to reading the SDC file; the properties of the SDC file, when loaded subsequently, is matched with the already extracted timing constraints, thus the properties are promoted to the top level. The one or more clocks are extracted from corresponding hardware description language of the sequential endpoint. The primary clocks are represented in a create_clock command and the generated clocks are represented in a create_generated_clock command. The extracted one or more clocks are independent of an incoming SDC file and the clocks are promoted to the top level along with properties like frequency, duty cycle, and other timing constraints. The method is used when modification of the SDC file is permitted to align the timing constraint of the lower level block with the timing constraint of the top level block. Thus, the lower level blocks timing is integrated with the top level's timing. The timing constraints are defined as primary clock, generated clock, clock transition, clock uncertainty, clock latency, propagated clock, disable timing, false path, Input/Output delay, Min/Max delay, multicycle path and the like in the SDC file for the corresponding block. This method of promotion is called as "Promotion with Integration". In other words, the block whose timing constraints are promoted is "Integrated" with the top levels timing.

In a third aspect of the present invention, a computerized method for promotion of a Synopsys Design Constraints file in a hierarchy of a block in a design is provided. This method is a mixture of both "Promotion with Isolation" and the "Promotion with Integration" methods described previously. The method comprises steps of: In a first mode: extracting, one or more primary clocks defined in the SDC file for corresponding one or more blocks of the design; and replacing, said one or more primary clocks of the corresponding block with a one or more generated clocks and stitching said one or more generated clocks to a top level's extracted clocks. In a second mode: extracting, one or more clocks from a clock pin of one or more sequential endpoints; and generating automatically a primary clock and a generated clock, prior to reading the SDC file; wherein the properties of said SDC file, when loaded subsequently, are matched with the extracted one or more clocks and the properties are promoted to the top level block. The SDC files are comprised of timing constraints and other parameters such as timing exceptions, clock relationships specified in the set_clock_groups command, input and/or output delays and the like. The clocks are promoted to the top level along with properties like frequency, duty cycle, and other timing constraints. In the first mode, the timing constraints promotion is dependent upon the block's SDC file and hence the constraints in the block's SDC file is preserved and promoted as-is to the top level with appropriate hierarchy reflected in the path name; and in the second mode, the extracted one or more clocks are independent of an incoming SDC file. The SDC file comprises definitions of generated clock, clock transition, clock uncertainty, clock latency, propagated clock, disable timing, false path, Input/Output delay, Min/Max delay, multicycle path and the like for the corresponding block. In the first mode modification of the SDC file is permitted or the user can modify the SDC file while preserving the timing intent of the design and in the second mode modification of the SDC file is not permitted or the user does not want to modify the SDC file.

In a fourth aspect of the present invention, a computerized method for promotion of a Synopsys Design Constraints file in a hierarchy of a block in a chip is provided. The method comprises of automatically promoting the constant values defined through the set_case_analysis command in the SDC file. The constant value as defined in the block levels SDC file on a pin or port at the boundary of the isolated block of the logic design is extracted and the corresponding top level constant value computed. The top level computed constant value at the start point or multiple start points must satisfy the block level constant value at the boundary of the block level. In other words, the top level constant value when propagated through the logic design reflects the original constant value that was set through the set_case_analysis command in the isolated blocks SDC file.

BRIEF DESCRIPTION OF DRAWINGS

The preferred embodiment of the invention will hereinafter be described in conjunction with the appended drawings provided to illustrate and not to limit the scope of the invention, wherein like designation denote like element and in which.

DETAILED DESCRIPTION

In the following detailed description of embodiments of the invention, numerous specific details are set forth in order to provide a thorough understanding of the embodiments of the invention. However, it will be obvious to a person skilled in art that the embodiments of the invention may be practiced with or without these specific details. In other instances, well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

Generally, the timing constraints are written in SDC format. The basic and essential timing constraints that are defined in the SDC files are clock definitions, clock relationships, their properties, timing exceptions, interface timing definitions, constant definition and general design rule constraints. All the aforementioned commands are related to timing specification of the SoC design. These constraints have commands such as, but not limited to, create_clock, create_generated_clock, set_clock_groups, set_case_analysis, set_clock_transition, set_clock_uncertainty, set_clock_latency, set_disable_timing, set_false_path, set_input_delay, set_output_delay, set_min_delay/set_max_delay and set_multicycle_path. These timing constraints help designers to correctly set up the clocks and timings of the SoCs.

The timing constraints are usually developed bottom up starting with each block while the top level hardware description language is still being developed. Conventionally, integration of IP constraints poses a challenge because the timing designer must first understand the IP or block's clocking, which is very hard and tedious. Also, the conventional methods involve manual connection of many clocks between blocks in order to stitch the top level, thus resulting in error prone SDC. Depending upon the design size, many man-months are required for correctness of the SDC.

Creating the top level timing constraints is a very difficult task. While developing the top level timing constraints, designers are faced with two options: either to develop a top level timing while preserving the block level timing by itself, or to violate the block level timing in order to make its timing reflect in-context to the top level timing. In an embodiment, the present invention outlines a method of automatically promoting the lower level block's timing constraints to the top level; at the same time providing an option to preserve the timing intent of the lower level blocks, or to modify it such that the block level timing is in-context to the top level timing.

In an embodiment of the present invention, a method for an accurate and an error free promotion of timing constraints is provided, where the timing constraint is promoted from the lower level block to the upper level block of the logic design or SoC. The method promotes a Synopsys design constraint file to the upper level block to manage the timing constraints while maintaining an original timing intent of the lower level block.

Figure 1:
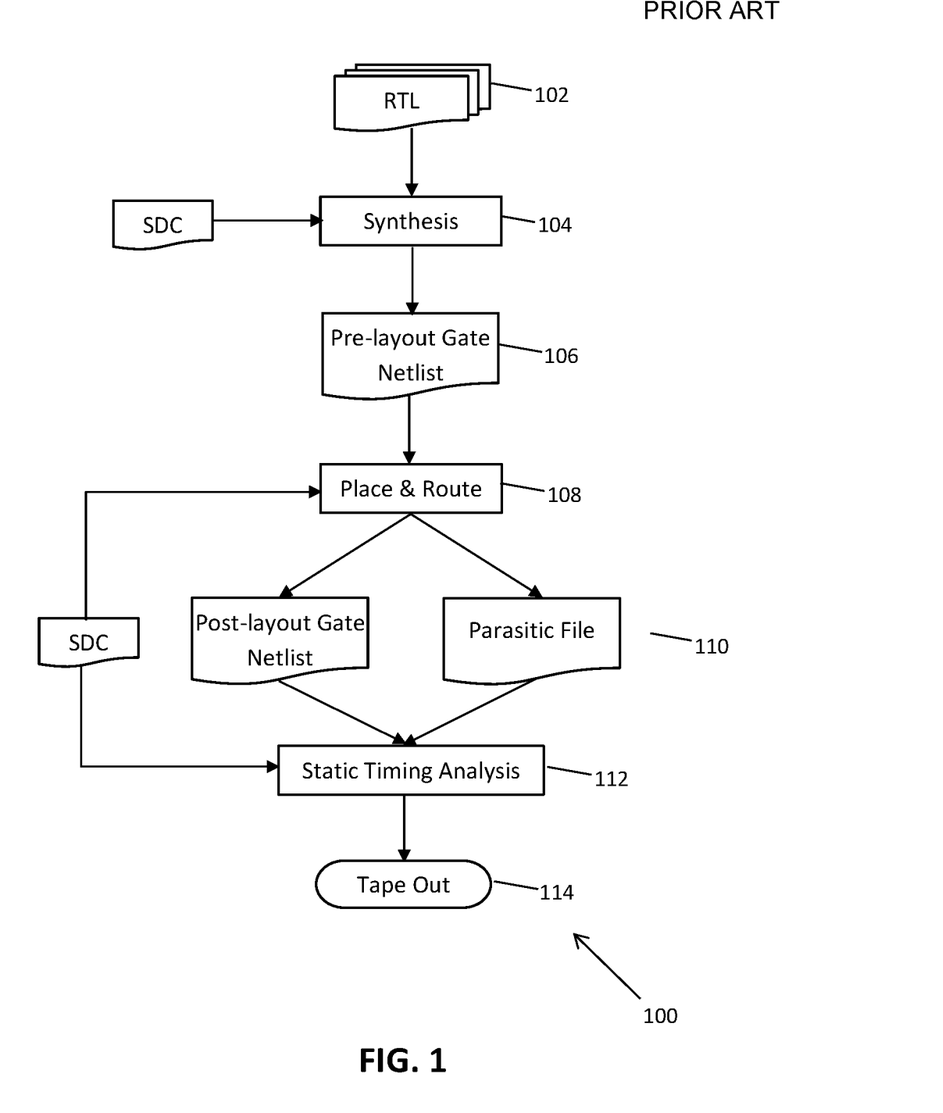
FIG. 1 illustrates a basic design flow of an application specific integrated circuit (ASIC).

FIG. 1 illustrates a basic design flow of an application specific integrated circuit (ASIC). ASICs are a type of integrated circuit that is contrived for performing specific applications. The functionality of the ASIC is coded in RTL (Register Transfer Level) at level 102. RTL is a design abstraction that is used in logic design phase to create a high level representation of a synchronous digital circuit. RTL models the flow of digital data between a plurality of hardware registers. The RTL description are then subsequently converted to a gate level description such as AND, OR, XOR etc. at level 104. After the synthesis of the RTL into a lower abstract level, the synthesis results from level 104 result in a pre-layout gate netlist at level 106, wherein the pre-layout gate netlist represents the connectivity of the gates like AND, OR, XOR etc. to each other. These gates are connected together, thus called netlist, to represent the same functionality as that of RTL. The pre-layout gate netlist comprises of a list of pins or terminals of the gates and other electronic components. The design flow 100 is constrained for timing using Synopsys design constraints (SDC) format that describes parameters such as clock frequency, clock relationships, input and output delay and the like. Subsequently, the gates are placed in a canvas representing a chip that contains actual physical sizes of the gates. Once placed, the gates are connected together representing the same functionality, using a plurality of metal wires. This physical layout is created at level 108 by a place and route tool. The place and route tool may further perform delay extraction process, which writes out the delay for each net segment of the plurality of metal wires that is the connection between gates. In other words, the place and route tool at level 108 places gates in physical form and routes them together based on the timing specified in the SDC file. At level 110, a post-layout gate netlist and a parasitic file is created, wherein the post-layout gate netlist contains the list of physically connected layout and the parasitic files contains the routed net delays of the metal wires. At the last level 112, static timing analysis is performed on the post-layout gate netlist with extracted delays annotated to the plurality of nets, wherein the post-layout gate netlist is a post routed netlist. If timing analysis passes, the ASIC is then ready for tape-out at level 114.

The SDC file used during the different phases of the ASIC design flow is similar in nature, but may contain additional constraints or different types of constraints along the different phases of the ASIC design. Thus, the SDC used for RTL may differ from that used for the place and route tool and the static timing analysis.

The process of writing the SDC is very laborious and error prone process. In addition, the fact that the ASIC may be designed for several functionalities implies that the SDC file is needed that represents each functionality. Further, today's system on chip (SoC) is complex and contains millions of gates. Thus, in order to implement the SoCs, the SoCs are partitioned into several blocks in order to minimize the time it takes for various ASIC tasks and to parallelize/distribute the tasks between the design teams. For each block and functionality, an SDC is needed. Most chips are developed bottom up, i.e. the blocks are coded, synthesized, placed and routed and timed first. This process is called hardening of the blocks. The hardened blocks may be termed as hard macros. An abstract model of the hardened model of the hardened macro is generated, which is then placed and routed with other hardened macros. Thus, the SoC may contain several hierarchies reaching up to the top level. As mentioned earlier, for each block an SDC is needed. Thus, each hierarchy can be considered as a block and an SDC is needed for each hierarchy. The present invention thus outlines that how lower level and/or any level SDC file can be automatically promoted to the top level block. The 'SoC', the 'ASIC' and the 'chip' may be interchangeably used and are represented by the same numerical reference without departing from the meaning and scope of the present invention.

Figure 2:
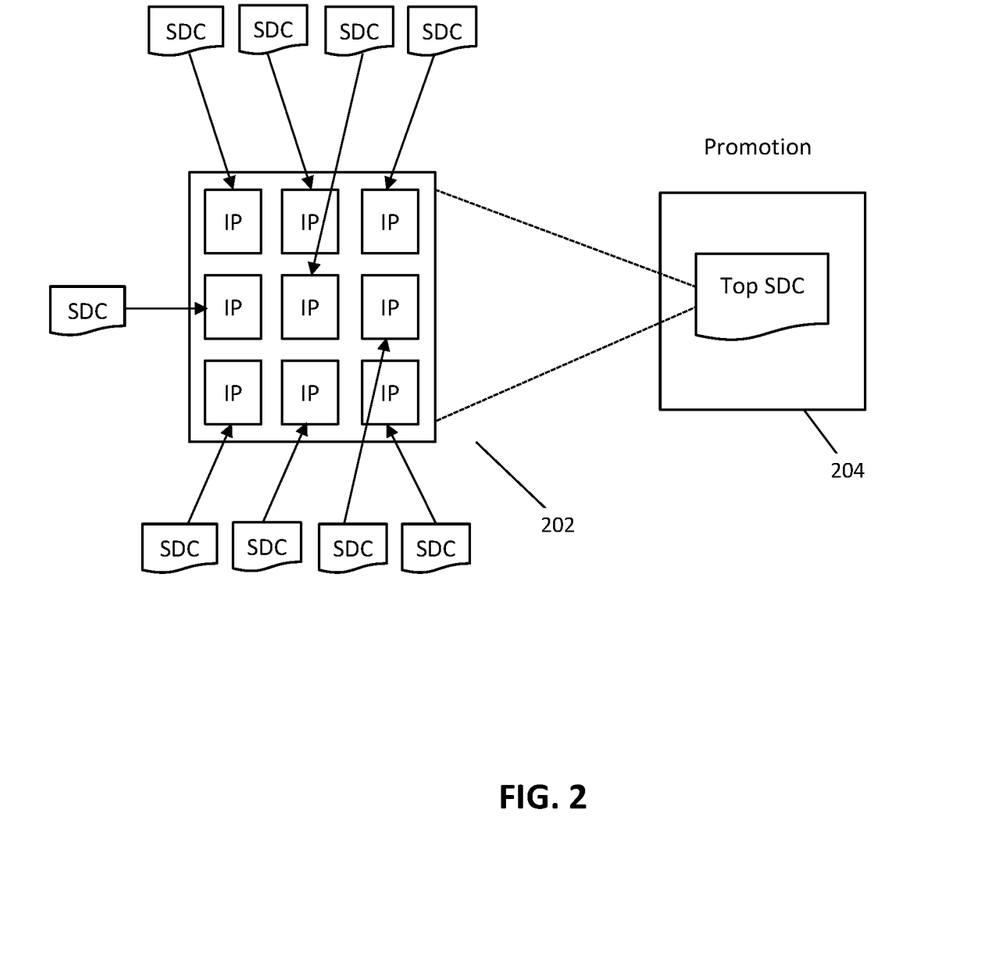
FIG. 2 represents a block diagram of promotion of SDC files from a lower level block to a top level block, in accordance with an embodiment of the present invention.

FIG. 2 represents a block diagram of promotion of SDC files from a lower level block to a top level block, in accordance with an embodiment of the present invention. SDC files are defined in the Synopsys design constraints format. The basic and essential timing constraints that are defined in the SDC files are clock definitions, clock relationships, their properties, timing exceptions, interface timing definitions, constant definition and general design rule constraints. These timing constraints have commands such as, but not limited to, create_clock, create_generated_clock, set_clock_groups, set_case_analysis, set_clock_transition, set_clock_uncertainty, set_clock_latency, set_disable_timing, set_false_path, set_input_delay, set_output_delay, set_min_delay/set_max_delay and set_multicycle_path. These timing constraints help designers to correctly set up the clocks and the rest of the timings of the SoCs as the SoC contains large amount of external and/or internal partitioned unit termed as IP blocks or IP. Each IP has its own timing constraints written in SDC file, shown with numerical reference 202 and the timing constraints are then extracted and promoted to the top level block 204.

In an embodiment of the present invention, all the clocks of the SoC are automatically discovered by a computer implemented method. The automation provided by the software tool helps in reducing the manual identification and writing of all clocks. After automatic discovery of the clocks, the clocking structure is being displayed to the designers to make them easily understand the clock network and correct the issues, if any. These clocking structures are then promoted to the upper level block after solving the constraints conflicts. After promotion of the timing constraints, the present invention helps in preserving the original timing intent of the SoC using SDC file.

The software tool disclosed by the present invention acts as a constraint compiler tool that automatically generates SDC file for any level or any mode of a block hierarchy, thereby shortening the timing closure cycle. The software tool redefines the timing constraints by aligning front end and back end in the design cycle of a chip and generates and manage design timing constraints for all modes of the operation while providing feedback to the designer at all stages of the chip design. By using the software tool disclosed in the present invention, generation of timing constraints can start right from RTL development stage or any stage in the ASIC process. On the basis of available information, user can refine and complete the constraints as per requirement. All information is traced through the software tool and can be reviewed through reports or visualization of simulated timing data.

In another embodiment, the present invention outlines that the software tool can work in two modes for timing constraints promotion: an integration mode and an isolation mode.

In the integration mode, the clocks are extracted independent of the incoming SDC file and are used when modification or completion of IP SDC is permitted. Contrary, in the isolation mode, the clock extraction is dependent on the incoming SDC file and used when modification of IP SDC is not permitted or a user does not want to modify it.

In another embodiment, the software tool can be implemented for both the aforementioned modes, called as a mixed mode, for promotion of timing constraints, wherein the mixed mode is a combination of both isolation mode and integration mode. For instance, if a lower level block is isolated but the top level block is integrated. This shows implementation of the mixed mode.

Figure 3:
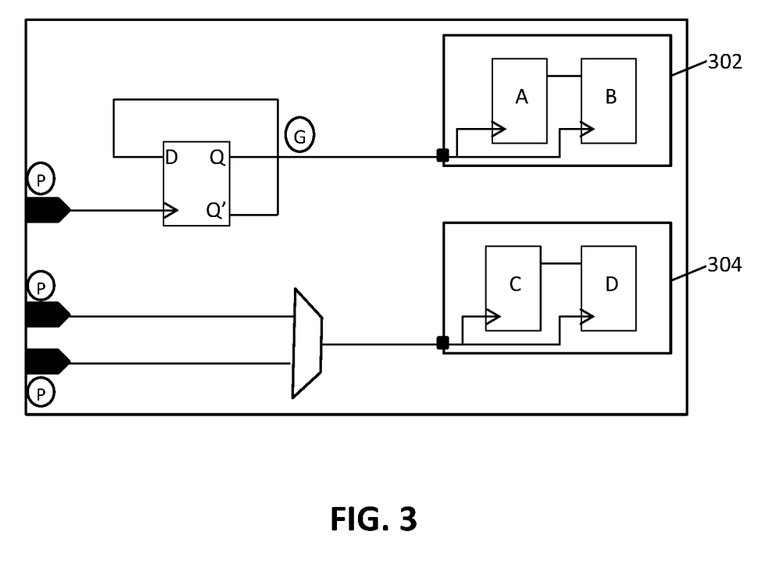
FIG. 3 represents a schematic representation of promotion of SDC constraints in an integration mode of a block, in accordance with an embodiment of the present invention.

FIG. 3 represents a schematic representation of promotion of SDC constraints in an integration mode of a block, in accordance with an embodiment of the present invention. In the integration mode, the timing intent of the lower level block is modified such that the block level timing is in context to the top level block. The integration mode is independent of the input SDC file that contains the timing constraints. Thus, a clock is extracted from all the clock pins of sequential elements, regardless of any input SDC file.

In FIG. 3, the clock is extracted by a software tool from the sequential endpoints A, B, C and D, while working in the integration mode. Clocks are automatically generated at the points shown denoted by P and G, where P stands for primary clock and G stands for generated clock having commands as create_clock definition and create_generated_clock definition respectively. All the commands are written in SDC format. Since, the clocks are extracted from the hardware description language (HDL); independent of the SDC file of each block 302 and 304, the timing intent captured in the SDC file is lost. However, when the SDC is loaded subsequently, all the timing constraints in the SDC file that match the software tool's already extracted points are attached to the points and subsequently promoted. In the integration mode, the clock extraction starts from each endpoint clock pin, where all clock pins are already extracted by the software tool, prior to reading a user's SDC file. The resulting SDC may not be same as the original SDC; however some modification may occur to align it with the top level timing constraints.

In an exemplary embodiment, if the top level block is having synchronous clock and the lower level block SDC is having asynchronous clock, then the top level block overwrites the lower level block SDC and makes the asynchronous clock synchronous. This represents that in the integration mode, the original timing intent in the blocks SDC file is not preserved.

Figure 4:
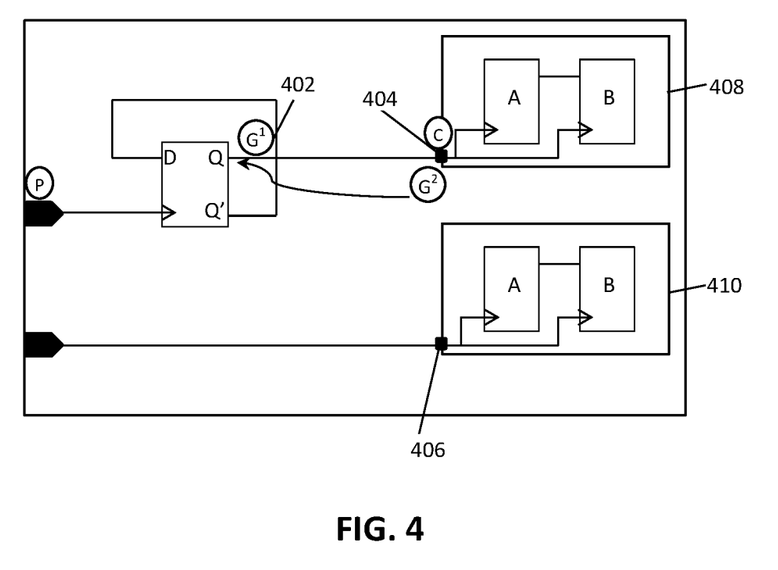
FIG. 4 represents a schematic representation of promotion of SDC constraints in an isolation mode of a block, in accordance with an embodiment of the present invention.

FIG. 4 represents a schematic representation of promotion of SDC constraints in an isolation mode of a block, in accordance with an embodiment of the present invention. The isolation mode is wholly dependent on a block's timing constraints as defined in its SDC file. The clock extraction starts from where a clock is defined in an SDC file of a block. In FIG. 4, P defines a software tool's extracted clock in the integration method, C defines the original primary clock defined in the IP SDC file, $G^1$ defines extracted generated clock using integration method and G2 defines the promoted generated clock with SDC having commands as extracted—create_clock, IP SDC—create_clock, extracted-create_generated_clock and promoted SDC—create_generated_clock respectively. When the software tool works in the isolation method, clock extraction starts from a port 404 of the block 408 that is targeted for the isolation, on which a create_clock is defined in the SDC file. User's SDC is preserved during the isolation mode and then promoted to the top level, wherein the primary clock C at the boundary of the isolated block is replaced with corresponding generated clock $G^2$. In other words, the extraction of clocks starts from where the clock is defined in the block's SDC file. The extraction starts from this point backwards.

In an embodiment of the present invention, the isolation mode basically involves two steps. In the first step, clocks are extracted from where the create_clock is defined in the IP SDC. If there is no SDC and the block is not marked for isolation, then clocks are extracted from the clock pin of the sequential endpoints. In the second step, the IP create_clock is replaced with create_generated_clock with the same name as the create_clock C, and the clock properties such as frequency, duty cycle, and other timing constraints are applied to the replaced generated clock $G^2$ and subsequently promoted to the top level. After this, master relationship is identified and created, shown by numeral reference 402, for each block. Thereafter, all the other constraints describing clock relations, exceptions, 10 delays and the like are generated referring to the name of the generated clock $G^2$ In contrast to the integration mode, the isolation mode is wholly dependent on the block's timing constraints. As mentioned earlier, the clock extraction starts from where the clock is defined in the blocks SDC file. In FIG. 4, C is the point (port 404) where the create_clock is defined. The extraction starts from this point backwards. In addition, the create_clock C is replaced with a generated clock $G^2$ and stitched to the top level extracted clock $G^1$ (402). Thus, any other timing constraint in the block SDC which previously referred to the original create_clock's name remains valid since the clock name is same albeit the clock type is changed from create_clock to create_generated_clock. Thus, the timing intent of the block is preserved and remains unchanged.

In an embodiment of the present invention, if no create_clock is defined in the SDC, as shown for a port 406, hence no clocks will be extracted for the port 406. In another embodiment of the present invention, for the top level, if no SDC is supplied for block 410 and the block is marked for isolation, then no corresponding top level clock is extracted.

Figure 5:
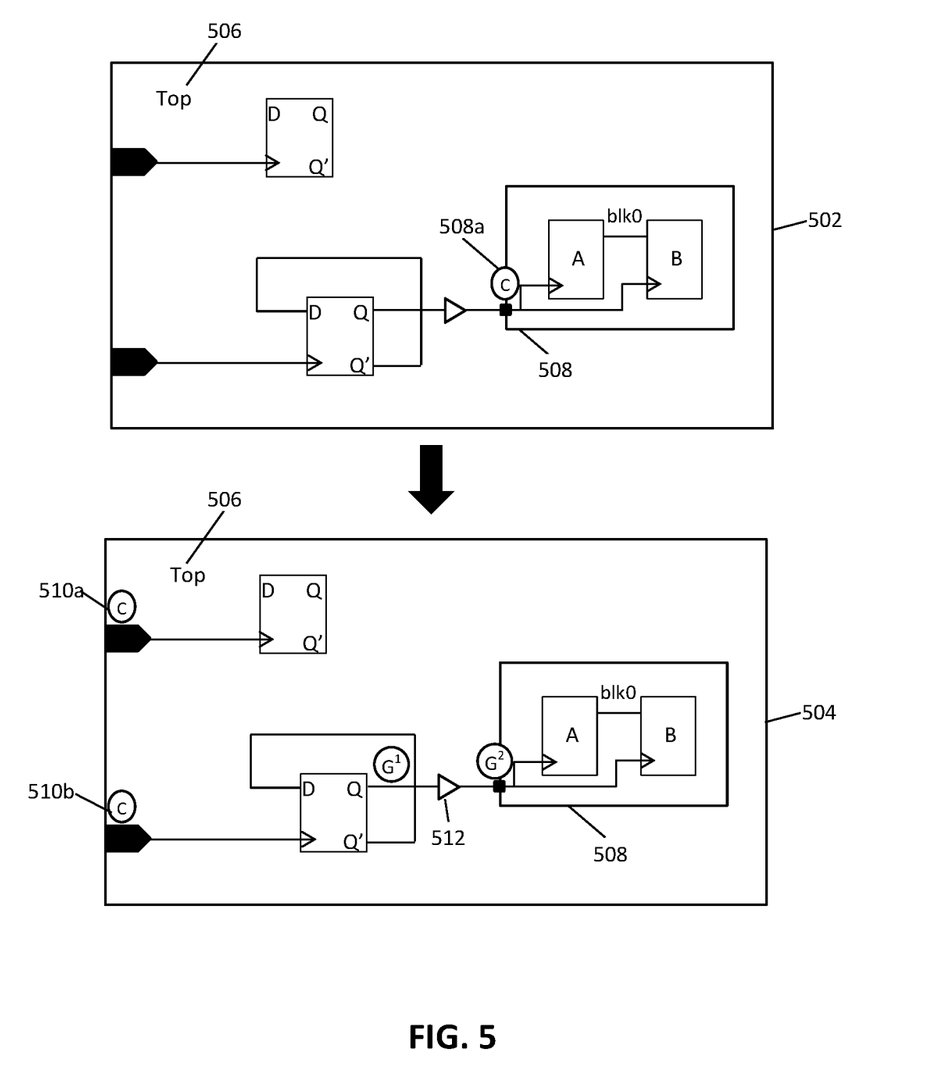
FIG. 5 represents an exemplary implementation of promotion of SDC constraints in a mixed mode, in accordance with an embodiment of the present invention.

FIG. 5 represents an exemplary implementation of promotion of SDC constraints in a mixed mode, in accordance with an embodiment of the present invention. In an exemplary embodiment, FIG. 5 illustrates a mixed mode with a lower block in isolation mode and a top level block in integration mode, as the mixed mode is a mixture/combination of both integration mode and isolation mode. The block working in the isolation mode can be termed as an isolated block and the block working in the integration mode can be termed as an integrated block. FIG. 5 comprises of two blocks 502 and 504, wherein 502 represents a block with no clocks at a top level 506 i.e. the integrated block and the isolated block 508 with a defined IP SDC create_clock C, wherein 502 illustrates a basic block and 504 represents an outcome of implementing the mixed mode on 502. The block 504 comprised of an extracted and generated clock; and a promoted clock. In FIG. 5, C 508a is the IP SDC—create_clock defined for the isolated block 508. In the block 502, there is no clock defined at the top level 506 and only IP SDC is defined for the isolated block 508. The mixed mode is implemented on the block 502, while keeping the top level 506 in the integration mode and block 508 isolation mode. The resultant block 504 then have its own created, generated and promoted constraints for the top level, wherein C 510a and C 510b represents the extracted create_clocks and $G^1$ represents the generated clock for the top level 506. Further, create_clock C 508a of the block 502 is then replaced with a generated clock $G^2$. In this way, the clocks and the timing constraints are generated by utilizing the mixed mode. In this example, the clock for the top level 506 is generated without having any SDC and no clock is preserved for 512; while clocks for the isolated block 508 are promoted while preserving the timing constraints $G^2$ of the isolated block 508.

Figure 6A:
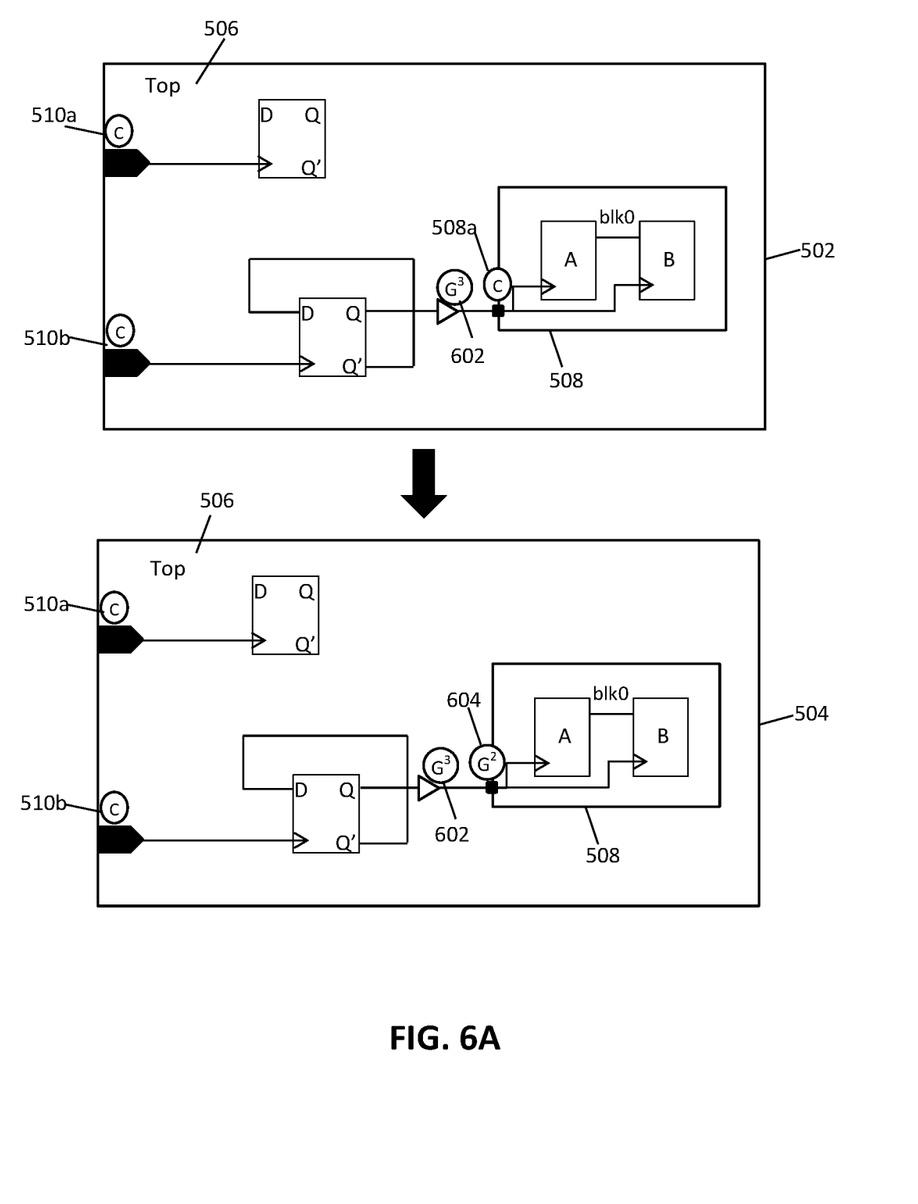
FIG. 6A represents an exemplary implementation of promotion of SDC constraints in the isolation mode, in accordance with an embodiment of the present invention.

FIG. 6A represents an exemplary implementation of promotion of SDC constraints in the isolation mode, in accordance with an embodiment of the present invention. In FIG. 6A, in both blocks 506 and 508, the timing constraints or SDC are promoted in isolation mode. Before switching to the isolation mode for the block 502, the top level 506 have IP SDC create_clocks 510a and 510b. Further, the block 502 has a generated clock $G^3$ 602 and the isolated block 508 has its own create_clock C 508a. When the software tool works in the isolation mode for the block 502, a clock $G^2$ 604 is promoted to the top level. While this implementation, the clock $G^3$ 602 is preserved unlike the integration mode and $G^2$ 604 is promoted to the top level.

Figure 6B:
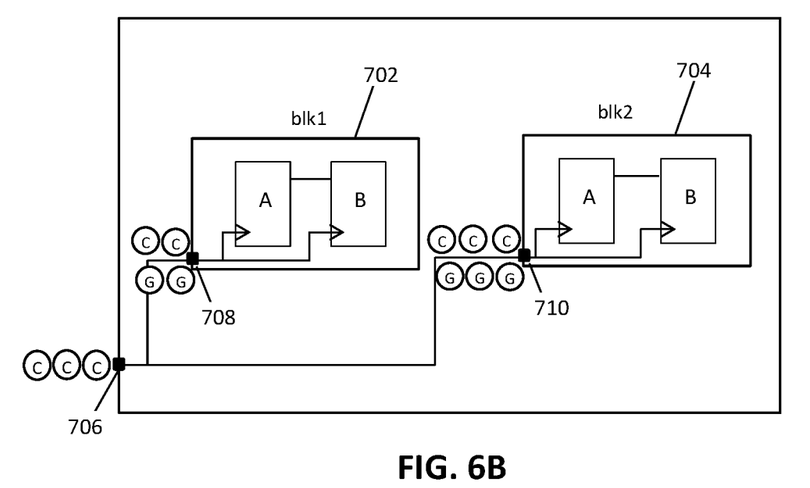
FIG. 6B represents another exemplary implementation of promotion of SDC constraints in the isolation mode, in accordance with an embodiment of the present invention.

FIG. 6B represents another exemplary implementation of promotion of SDC constraints in the isolation mode, in accordance with an embodiment of the present invention. FIG. 6B comprises of two blocks blk1 702 and blk2 704. For blk1 702, two IP SDCs are defined as C at port 708 and for blk2 702, three IP SDC are defined as C at port 710. Since the isolation mode is totally based on data extracted from SDC files, thus the IP SDCs are predefined for each block. In an exemplary embodiment, the create_clock or IP SDCs C for the port 708 of the blk1 702 are defined as create_clock—period 2 [get_pins clk] and create_clock—period 3 [get_pins clk]. Similarly, the create_clock or IP SDCs C for the port 710 of the blk2 704 are defined as create_clock—period 2 [get_pins clk]; create_clock—period 4 [get_pins clk] and create_clock—period 6 [get_pins clk].

In this case, the fastest clocks between the pair of clocks for both the blocks blk1 702 and blk2 704 are chosen for promotion. Thus, the top level promoted clocks at C 706 will be create_clock—period 2 [get_pins clk]; create_clock—period 3 [get_pins clk] and create_clock—period 6 [get_pins clk]. These clocks from the ports 708 and 710 of blk1 702 and blk2 704 respectively are promoted to the top level. In this way, All the IP SDCs C at the ports 708 and 710 are replaced by promoted SDCs with create_generated_clock command, as shown in Table 1.

TABLE 1

| blk1 | blk2 | Fastest Clock | Notes |
| --- | --- | --- | --- |
| 2 ns | 2 ns | 2 ns | Both periods are identical, thus 2 ns is promoted. |
| 3 ns | 4 ns | 3 ns | 3 ns is promoted and 4 ns clock is discarded. blk2 will also receive 3 ns clock. |
|  | 6 ns | 6 ns | 6 ns will be promoted and blk1 will also receive the 6 ns clock. |

Figure 7:
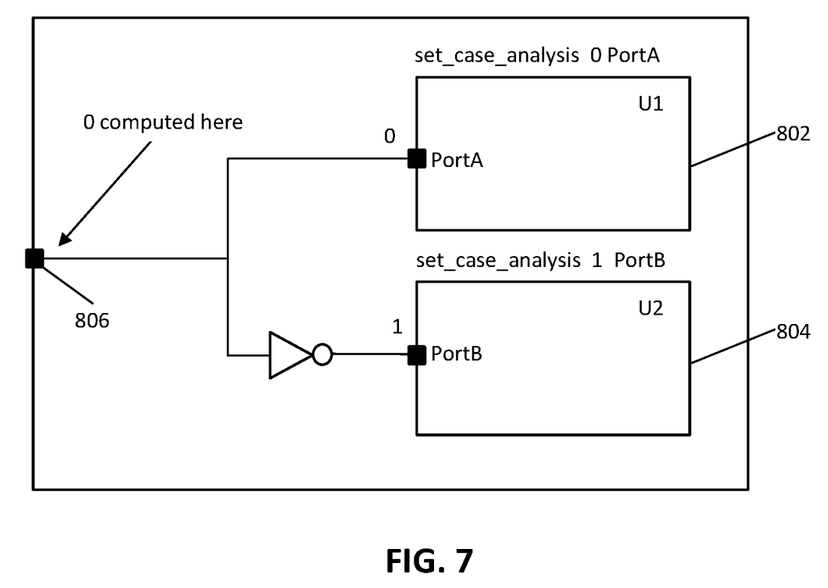
FIG. 7 represents an exemplary illustration of promotion of constant values in a SDC file, in accordance with an embodiment of the present invention.

FIG. 7 represents an exemplary illustration of promotion of constant values in a Synopsys Design Constraint file, in accordance with an embodiment of the present invention. A method for promotion of a Synopsys Design Constraints file in a hierarchy of a block in a chip is illustrated in FIG. 7. The constant values of the corresponding blocks are defined through a set_case_analysis command in the SDC file. FIG. 7 comprises two blocks 802 and 804 having port A and port B respectively. The block 802 has a constant value extracted as 0 at port A, and the block 804 has the constant value extracted as 1 at port B that are defined through the corresponding commands set_case_analysis 0 [get_ports PortA] and set_case_analysis 1 [get_ports PortB]. The constant value as defined in the block levels SDC file on a pin or port at the boundary of the isolated block of the logic design is extracted and the corresponding top level constant value is computed.

To specify a given mode of the logic design without altering the netlist structure, it is necessary that the top level constant value, when propagated through the logic design, must reflect the original constant value that was set through the set_case_analysis command in the isolated blocks SDC file. The top level constant value is computed by selection of ports or pins that will influence the mode of operation of the logic design because the computed top level constant value at the start point or multiple start points must satisfy the block level constant value at the boundary of the block level. In FIG. 7, the block 802 and the block 804 are the isolated blocks of the logic design, whose values are extracted at the port A and the port B as 0 and 1 and corresponding top level constant value is computed as 0 at a start point 806. In this exemplary embodiment, the original constant value is set to 0 on port A using the set_case_analysis command in the isolated blocks 802 and a constant value of 1 on port B using the set_case_analysis command in the isolated block 804 in the SDC file. The top level constant value is computed as 0 at a start point 806 and then propagated through the network (logic design) as long as the controlling value is set to the same constant value.

The present invention provides seamless navigation between various layers of hierarchy in a chip design and automatically propagates necessary information in real time while checking for validity of data in the context of the entire design. The present invention uses Synopsys design constraints (SDC) file formats. The modes presented in the invention also provide auto validation of any information entered by user for any layer of hierarchy of the entire design. No prior knowledge of SDC syntax is required by the designer. The present invention has advantages over prior system by providing a method of automatically generating SDC for any level of hierarchy and for any mode of the SoC, thereby significantly shortening the timing closure cycle. The present invention redefines the timing constraints landscape by aligning front-end to back-end early in the design cycle, thus eliminates the existing disconnect between timing assumed in simulation test benches, and the timing coded in the SDC files for implementation activities and further eliminates the manual process of tracing the RTL/Gates.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

We claim:

1. A computer implemented method for promotion of a timing constraint from a lower level block to a top level block having one or more extracted clocks of an integrated circuit, comprising steps of:
   extracting one or more primary clocks defined for a lower level block of the integrated circuit; and
   replacing said one or more primary clocks of the lower level block with one or more generated clocks in a Synopsys Design Constraints (SDC) file and stitching said one or more generated clocks to one or more extracted clocks of the top level block in a promoted SDC file.

2. The computer implemented method of claim 1, wherein said one or more primary clocks are represented in a create_clock command of the lower level blocks.

3. The computer implemented method of claim 2, wherein said one or more generated clocks are represented in a create_generated_clock command of the lower level blocks.

4. The computer implemented method of claim 3, wherein said create_clock is replaced with a create_generated_clock in the promoted SDC file, and said SDC file includes timing constraints of lower level block of integrated circuit.

5. The computer implemented method of claim 1, wherein for each generated clock of the lower level blocks, a master relationship to clock of the top level block is identified and created; and mapping the timing relationships that were previously related to the one or more primary clocks, to the one or more generated clocks of the lower level blocks.

6. The computer implemented method of claim 1, wherein the SDC file is preserved and promoted to the top level.

7. The computer implemented method of claim 1, further comprising prior to the extracting step of claim 1, determining whether or not the lower level block timing is isolated from the top level block timing wherein if true proceeding to extracting.

8. A computer implemented method for promotion of a timing constraint from a lower level block to a top level block of an integrated circuit, the comprising the steps of:
   extracting one or more clocks of a lower level block and generating a primary clock and a generated clock for said one or more clocks of the lower level block from the Hardware Description Language (HDL);
   loading a SDC file of the lower block, and mapping the constraints of the primary clock and the generated clock of the lower block extracted from the HDL with constraints of the SDC file of the lower block;
   promoting the mapped constraints of the primary clock and the generated clock of the lower block to a SDC file of a top level block.

9. The computer implemented method of claim 8, wherein said extracted one or more clocks of a lower block are independent of the SDC file.

10. The computer implemented method of claim 8, further comprising prior to the extracting step of claim 8, determining whether or not the modification of the SDC file is permitted to align the timing constraint of the lower level block with the timing constraint of the top level block, wherein if true proceeding to extracting.

11. A computerized method for promotion of a Synopsys Design Constraints (SDC) file in a hierarchy of a block in a design, comprising the steps of:
   in a first mode:
      extracting one or more primary clocks defined in a SDC file for a lower level block of the integrated circuit; and
      replacing said one or more primary clocks of the lower level block with one or more generated clocks in the SDC file and stitching said one or more generated clocks to one or more extracted clocks of a top level block in a promoted SDC file;
   in a second mode:
      extracting one or more clocks of a lower level block and generating a primary clock and a generated clock for said one or more clocks of the lower level block from the Hardware Description Language (HDL);
      loading a SDC file of the lower block, and mapping the constraints of the primary clock and the generated clock of the lower block extracted from the HDL with constraints of the SDC file of the lower block;
      promoting the mapped constraints of the primary clock and the generated clock of the lower block to a SDC file of a top level block.

12. The computerized method of claim 11, wherein a first mode further comprises preserving and promoting a SDC file to the top level.

13. The computerized method of claim 11, wherein in the second mode the extracted one or more clocks are independent of the SDC file.

14. The computerized method of claim 11, wherein in the first mode, the SDC file is modifiable while preserving the timing intent of the design.

15. The computerized method of claim 11, wherein in the second mode, the SDC file is not modifiable.

16. A computer implemented method for promotion of a Synopsys Design Constraints (SDC) file in a hierarchy of a block in a chip, the method comprises the steps of:
   extracting a constant value defined in a block level's SDC file on a port at a boundary of an isolated block of a logic design; and
   computing a top level constant value at & one or more start points of the logic design on the basis of extracted constant value, wherein the top level constant value when propagated through the logic design reflects an original constant value in the isolated block's SDC file.

17. The computer implemented method of claim 16, wherein the original constant value is set through a set_case_analysis command in the isolated block's SDC file.

18. The computer implemented method of claim 16, wherein the constant values defined through the set_case_analysis command in the SDC file are automatically promoted to the top level.

* * * * *